Jan. 5, 1965

C. MacSPORRAN 3,164,358

SAFETY FLOW VALVE

Filed Aug. 17, 1960

INVENTOR.
CHARLES MAC SPORRAN
BY Hudson and Young

ATTORNEYS

Jan. 5, 1965

C. MacSPORRAN 3,164,358

SAFETY FLOW VALVE

Filed Aug. 17, 1960

INVENTOR.
CHARLES MAC SPORRAN

BY Hudson and Young

ATTORNEYS

United States Patent Office 3,164,358
Patented Jan. 5, 1965

3,164,358
SAFETY FLOW VALVE
Charles MacSporran, Bartlesville, Okla., assignor to Phillips Petroleum Company, a corporation of Delaware
Filed Aug. 17, 1960, Ser. No. 50,166
6 Claims. (Cl. 251—29)

This invention relates to a safety flow valve. In one aspect this invention relates to a combination safety flow valve and storage container assembly. In another aspect this invention relates to a combination of dispensing apparatus comprising said safety flow valve and storage container assembly.

In the handling of volatile fluids, such as liquefied petroleum gas and liquid ammonia, many safety requirements must be met. For example, such materials must be stored in especially constructed tanks which are capable of withstanding the relatively high vapor pressures of these materials. When introducing such a material into the container or removing it therefrom, it is necessary that the valve structures employed in such systems be provided with a number of safety features.

The present invention provides a valve structure wherein a number of the necessary safety features are combined in a single compact valve structure which is adapted for control by the fluid pressure of the product being handled. The valve of the invention can be rapidly and positively opened or closed by the proper application of the fluid pressure of the product being handled. The valve of the invention provides a positive shut off and fails safe in said shut-off condition upon either mechanical damage thereto or in the event of fire.

An object of this invention is to provide a safety flow valve which can be operated by the fluid pressure of the fluid being handled. Another object of this invention is to provide a safety flow valve which will open automatically when the fluid pressure from a connecting conduit containing the product being handled is applied to its actuating mechanism. Another object of the invention is to provide a safety flow valve which will close automatically when said pressure is removed from its actuating mechanism. Another object of the invention is to provide a safety flow valve which will fail safe upon mechanical damage to conduits or other fittings connected thereto. Another object of the invention is to provide a safety flow valve which will fail safe in the event of a fire in the vicinity of said valve and conduits connected thereto. Another object of the invention is to provide a safety flow valve which has a positive shut-off action under either normal operating conditions or under emergency conditions. Another object of this invention is to provide a safety flow valve structure which can be essentially internally mounted within a storage container with its main shut-off valve substantially level with the bottom of said container, thus protecting said valve structure from damage due to mechanical shock and providing for essentially complete withdrawal of the stored product from said container. A further object of this invention is to provide a safety flow valve which is simple in construction, reliable in operation, and economical to manufacture. Other aspects, objects, and advantages of the invention will be apparent to those skilled in the art in view of this disclosure.

Figure 1:
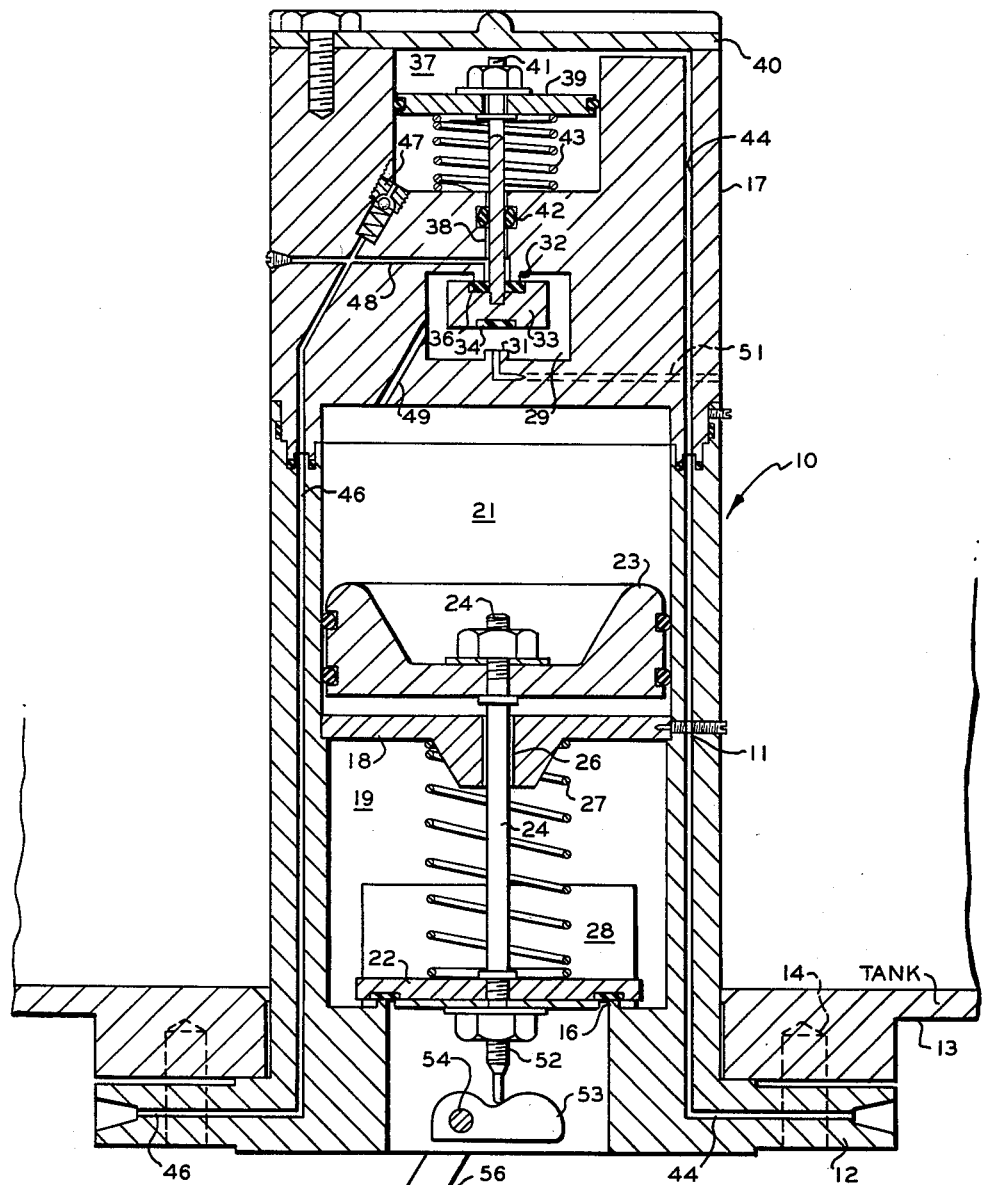
FIGURE 1 is a diagrammatic view, partly in cross section, of one embodiment of the safety flow valve of the invention.

Referring now to the drawings wherein like reference numerals are employed to denote like elements, the invention will be more fully explained. In FIGURE 1 there is shown a valve structure designated generally by the reference numeral 10. Said valve structure comprises a tubular valve casing 11 having means, such as a flange 12, at one end thereof for securing said casing to a container, such as tank 13, in such a manner that a substantial portion of said casing is positioned within said container. Stud bolts 14 can be employed for bolting said flange to said tank in which case suitable gasketing material (not shown) will be employed between said flange and said tank. While a flange has been illustrated as the means for securing said casing 11 to said tank 13, it will be understood by those skilled in the art that valve structures having a lower threaded end can be employed in tanks provided with threaded openings therein, and such valve structures are within the scope of the invention.

A main valve seat 16 is provided within said casing 11 adjacent said one end of said casing. A pilot valve body 17 is attached to, by means of the bolts (only one is shown) and sealing means shown, and closes the other end of said casing 11. Said pilot valve body 17 and casing 11 can be suitably keyed at their junction to cause proper alignment of the sections of hereinafter discussed conduits 44 and 46. There is thus formed a first chamber within said casing 11 which chamber is defined by said pilot valve body 17 and said main valve seat 16. A partition 18 extends transversely across and divides said first chamber into a first section 19 and a second section 21. A main valve head 22 is disposed within said first section of said first chamber and is adapted to seat at or engage said main valve seat 16. A first piston 23 is slidably disposed in said second section 21 of said first chamber. Valve rod 24 is attached at one end to said piston 23, extends through an opening 26 provided in said partition 18, and is connected at its other end to said main valve head 22. A spring 27 is mounted around said rod 24 between said partition 18 and said main valve head 22 and serves to bias said main valve head into normal engagement with said main valve seat 16. An opening 28 is provided in the wall of said first section of said first chamber adjacent said main valve seat. When the valve structure is inserted in a storage container as here illustrated, said opening 28 is an opening to said container and provides communication between the interior of said container and the interior of casing 11.

It is not essential that a transverse partition such as partition 18 be employed. However, such a partition is preferred because of the "dash-pot" action afforded by the relatively small opening 26 therein which prevents too rapid action of piston 23 with possible slamming of valve head 22 against valve seat 16. Any suitable supporting means, such as a spider of supporting arms, can be employed for mounting spring 27. If desired, spring 27 can be mounted in second section 21 between said piston 23 and the lower end of pilot valve body 17.

A second chamber 29 is formed within said pilot valve body 17 adjacent one end or side thereof. A first pilot valve seat 31 and a second pilot valve seat 32 are disposed within said second chamber on opposite sides thereof. A pilot valve head 33 is disposed within said second chamber. Said pilot valve head is provided with a first seating surface 34 on one side thereof which is adapted to engage said first pilot valve seat 31 and a second seating surface 36 on the opposite side thereof which is adapted to engage said second pilot valve seat 32. Access to said second chamber 29 can be gained through a cover plate (not shown) on the outside of pilot valve body 17. Said second chamber 29 can be formed in pilot valve body 17 in any suitable manner as by boring into said pilot valve body from one side and covering the outside of the opening with a cover plate. Also, if desired, said pilot valve body, instead of being formed integrally as shown, could be suitably divided into sections along a line extending transversely of said second chamber 29 and a portion of said chamber 29 formed in each section.

A third chamber 37 is formed within said pilot valve body 17 adjacent the other end thereof. A passageway 38 extends from said third chamber 37 through pilot valve body 17 and terminates in said second chamber 29 at said second pilot valve seat 32. A second piston 39 is slidably disposed within said third chamber. A rod 41 is attached at one end to said second piston 39 and extends through said passageway 38 to connect at its other end to said pilot valve head 33. Suitable sealing means, such as a resilient O-ring 42, is disposed in said passageway around said rod for preventing fluid communication between said second and said third chambers. A spring 43 is mounted around said rod 41 within said third chamber and functions to normally bias said second piston 39 in such direction as to cause said second seating surface 36 on said pilot valve head 33 to engage said second pilot valve seat 32. Access to said third chamber 37 can be gained by removing cover plate 40 which is held in place by a plurality of bolts only one of which is shown.

A first conduit 44 extends through flange 12, through the wall of casing 11, through said pilot valve body 17, and communicates with said third chamber 37 for ingress and egress of fluid pressure to and from said third chamber on the side of said second piston 39 away from said spring 43. A second conduit 46 extends through said flange 12, the wall of said casing 11, through said pilot valve body 17, and communicates with said third chamber 37 for egress of fluid pressure from the portion of said third chamber 37 which is not in communication with said first conduit 44. A one-way check valve 47, comprising a spring biased ball and a seat for said ball, is disposed in said second conduit 46 adjacent said third chamber for permitting fluid flow in a direction from said third chamber only. Any suitable type of one-way check valve means can be employed in place of that specifically illustrated.

A third conduit 48 connects into said second conduit at a point downstream from said check valve and communicates with said passageway 38 at a point between said sealing means 42 and said second pilot valve seat 32. A fourth conduit 49 provides communication between said second section 21 of said first chamber and said second chamber 29. A fifth conduit 51 extends from said first pilot valve seat 31 and said second chamber 29 to without said pilot valve body 17.

A stem 52 extends from the under side of said main valve head 22 and extends outside said first section 19 of said first chamber when said main valve head is seated in said main valve seat 16. A cam 53 is mounted on a shaft 54 which extends through the wall of said casing 11 adjacent said one end thereof. A lever 56 is attached to said shaft 54 on the outside of said casing 11 for rotating said shaft and cam. Said cam, acting against said stem 52, is operable to disengage said main valve head from said main valve seat when manual operation is desirable or necessary, as described further hereinafter.

Figure 2:
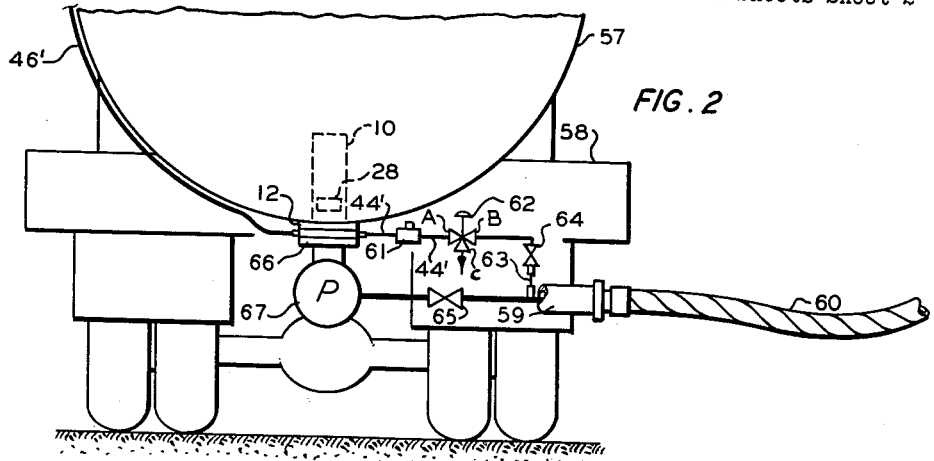
FIGURE 2 is a diagrammatic illustration of a combination safety flow valve and storage container assembly in accordance with the invention.

Referring now to FIGURE 2, there is illustrated a valve and storage container assembly in accordance with the invention wherein said valve structure 10 is secured to a container 57 in such a manner that a substantial portion of said valve structure is positioned within said container. Said container 57, as herein illustrated, is a tank mounted on the bed or frame 58 of a transport truck having self-propulsion means. Said container 57 can be any suitable container such as a railroad tank car, or a stationary storage tank. When the valve structure 10 is installed in a container, such as container 57, opening 28 is an opening from within casing 11 to the interior of said container 57. Likewise, said conduit 51, described in connection with FIGURE 1, provides communication between said second chamber 29 and the interior of said container 57.

In FIGURE 2 conduit 44' is an extension of first conduit 44 in FIGURE 1 and extends from said flange 12 to connect into product conduit 59. A fusible link 61 is disposed in said conduit 44' adjacent said flange 12. A three-way valve 62 having ports A, B, and C is also disposed in said conduit 44'. An orifice 63 is disposed in said conduit 44', preferably adjacent said product conduit 59. A block valve 64 is disposed in said conduit 44', preferably between said orifice 63 and said three-way valve 62. Said product conduit 59 is connected at one end to said flange 12 of casing 11 by means of a companion flange 66 as shown. Pump means 67 is disposed in said product conduit 59 adjacent said companion flange 66. Conduit 46' is an extension of said second conduit 46 in FIGURE 1 and extends from flange 12, up around the side of container 57, and vents to the atmosphere.

Figure 3:
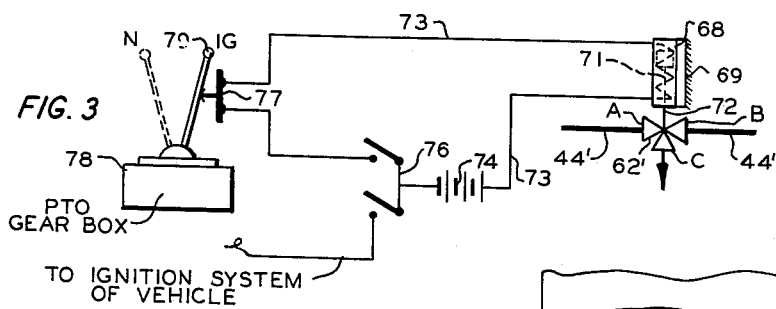
FIGURE 3 is a schematic illustration of one modification of the invention wherein a fluid dispensing system comprising a mobile vehicle having mounted thereon a storage container having a safety flow valve of the invention installed therein can be rendered non-operative except when said vehicle is non-mobile.
Figure 4:
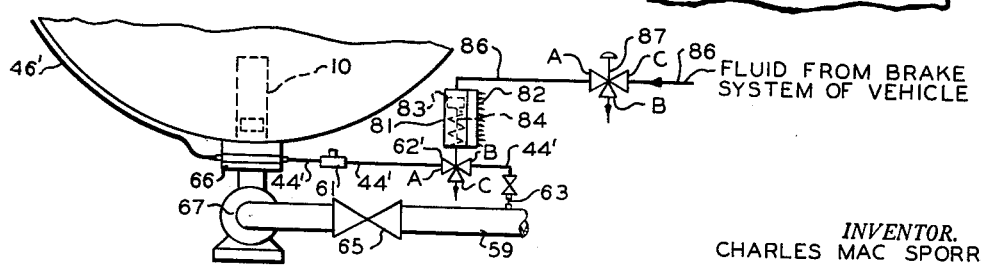
FIGURE 4 is a schematic illustration of another modification of the invention wherein a fluid dispensing system comprising a mobile vehicle having mounted thereon a storage container having a safety flow valve of the invention installed therein can be rendered non-operative except when said vehicle is non-mobile.

In the operation of the apparatus illustrated in FIGURES 1 and 2, assuming that the vehicle has been driven to its unloading spot and properly parked, the operator would first connect unloading hose 60 to product conduit 59 and to the storage container into which the contents of container 57 are to be pumped and then open said storage container into said hose 60. Said operator would then open block valve 65 which would permit fluid pressure from conduits 60 and 59 to pass through pump 67 and bear on the underside of main valve head 22 in valve structure 10. Pump 67 is then started unless the vehicle is provided with safety means such as illustrated in FIGURES 3 or 4 and described hereinafter. The operator would then open block valve 64 in conduit 44' and then switch three-way valve 62 from its normal position permitting flow through only ports A and C to a position permitting flow through only ports A and B. If desired, said three-way valve 62 can be spring loaded to normally hold same in the position where flow therethrough is through only ports A and C. In this event, a lanyard or other device which could be secured to some point on the vehicle would be required to hold said valve in the position permitting flow through only ports A and B. The use of such a spring loaded valve and a lanyard or other device would be advantageous in the event of an emergency and it was desired to quickly stop the unloading operation because the operator could merely release said lanyard and said valve 62 would switch from said A—B position to said A—C position.

Upon the opening of said three-way valve 62, i.e., switching said valve from the A—C to the A—B position, fluid pressure from product conduit 59 passes through conduit 44' and conduit 44 into third chamber 37. Said fluid pressure bears upon second piston 39 causing same to be forced downwardly. The pressure in the portion of third chamber 37 below said second piston 39 is vented through check valve 47, conduit 46, and conduit 46' to the atmosphere. Downward movement of said second piston 39 causes pilot valve head 33 to disengage second pilot valve seat 32 and to engage first pilot valve seat 31. This action removes application of fluid pressure from container 57 which had been exerted upon the upper side of first piston 23 through conduit 51, second chamber 29, and conduit 49. Upon the opening of second pilot valve seat 32, the fluid pressure in section 21 above said piston 23 is vented through conduit 49, second chamber 29, passageway 38, conduit 48, conduit 46, and conduit 46' to the atmosphere. This action reduces the pressure in section 21 to essentially atmospheric and the fluid pressure from within container 57 bearing against the under side of piston 23 (exerted through openings 28 and 26) will overcome the biasing action of spring 27 and cause said main valve head 22 to be lifted from engagement with main valve seat 16 and the valve to be opened. This action occurs because the surface area of piston 23 exposed to said pressure from container 57 is greater than the surface area of main valve head 22, and furthermore, is great enough so that the force acting thereon will overcome the combined force of spring 27 and pressure from container 57 acting on said valve head 22.

When the unloading operation is finished, the operator will close block valve 65 in conduit 59 and block valve 64 in conduit 44'. Said operator will then switch three-way valve 62 from its A—B position to its A—C position causing the fluid pressure in third chamber 37 to be vented to the atmosphere through conduit 44 and conduit 44'. Upon the venting of said third chamber 37, piston 39 rises, pilot valve head 33 disengages first pilot valve seat 31 and engages second pilot valve seat 32. Fluid pressure from container 57 will then be admitted via conduit 51, second chamber 29, and conduit 49 to section 21 above piston 23. This will cause the pressure on both sides of piston 23 to be essentially the same and the spring 27 will bias valve head 22 into engagement with main valve seat 16, thus closing the valve.

It is not essential that the operator close block valves 65 and 64 before switching three-way valve 62 from its A—B position to its A—C position. In fact, the simplest way to cause main valve head 22 to engage main valve seat 16 is to switch said valve 62 from its A—B position to its A—C position without closing block valves 65 and 64. In such event conduit 44' would be blocked, except for venting through ports A and C, and operation of pump 67 would tend to aid the closing action of main valve head 22. Such variations are within the discretion of the operator and are subject to local operating procedures.

The combination of apparatus illustrated in FIGURE 3 provides means for rendering an apparatus such as that of FIGURE 2 inoperative except when the transport truck on which it is mounted has been rendered non-mobile. In FIGURE 3 a solenoid 68 is mounted on said vehicle at a convenient point 69 (such as a point on bed 58) adjacent said three-way valve 62'. The core rod 71 of said solenoid is connected to stem 72 of said three-way valve 62'. A circuit 73 connects said solenoid 68 with battery 74 and ignition switch 76 of said vehicle. A second switch 77 is disposed in said circuit 73 and is adapted to be actuated to a closed position when the power take-off gears in power take-off gear box 78 are in an in-gear position. As shown in FIGURE 3, said switch 77 would be mounted adjacent the PTO gear shift lever 79 and when said gear shift lever is in an in-gear position, as shown, it would engage said switch 77 causing it to be in the closed position. Obviously, said switch 77 could be located within gear box 78. FIGURE 3 is intended to be a schematic illustration only. Those skilled in the art can devise other suitable arrangements of the apparatus illustrated in view of this disclosure.

In the operation of the apparatus of FIGURE 3, as here illustrated, three-way valve 62' would be normally biased by means of the spring on stem 72 to a vent position, i.e., permitting fluid flow through ports A and C only. When the transport truck is driven to its unloading position, the unloading hose 60 has been attached to product conduit 59 and the storage container into which the contents of container 57 are to be transferred, and all other unloading preparations have been completed as described above, ignition switch 76 will be closed to start the engine of the vehicle in order to operate the power take-off to drive pump 67. After said engine has been started, gear shift lever 79 will be shifted into the in-gear position as shown in the drawing, solenoid 68 will be energized and will overcome the biasing action of the spring on three-way valve 62', causing said valve to be rotated so that flow is through ports A and B. This will permit fluid pressure to flow from product conduit 59 through conduits 44 and 44' into third chamber 37, and main valve head 22 will be opened as described above to start the unloading of container 57. Upon completion of the unloading operation, the gear shift lever 79 will be shifted into the neutral position, breaking circuit 73 at switch 77, solenoid 68 will be de-energized, and the spring around stem 72 will bias three-way valve 62 to a position where flow is through ports A and C. This action causes venting of third chamber 37 through said first conduit 44 and conduit 44' which, as explained above, will cause main valve head 22 to seat at main valve seat 16 and close the valve. It will be understood that the vehicle in the apparatus of FIG. 3 is the type that when the power take-off gears are in operation, the normal driving gears are inoperable.

In FIGURE 4 there is illustrated another combination of apparatus for rendering an apparatus such as that of FIGURE 2 inoperative except when the transport vehicle is in a non-mobile condition. In FIGURE 4 a cylinder 81 is mounted on said vehicle at a convenient point 82 (such as a point on bed 58) adjacent said three-way valve 62'. A spring loaded fluid actuated piston 83 is slidably disposed in said cylinder. A rod 84 is attached at one end to one side of said piston 83 and is attached at its other end to the stem of said three-way valve 62. Brake fluid conduit 86, extending from the brake system on said vehicle, is connected to said cylinder on the side of said piston away from said rod 84. On vehicles equipped with air brakes, said conduit 86 is connected into the braking system in such manner that it is pressurized only when the brakes are in braking position, e.g., downstream of the valve or other means, operated by the brake foot pedal and/or hand lever, and controlling flow of air from the brake-air tank to the brakes of the vehicle.

The apparatus of FIGURE 4, as here illustrated, is designed for use on vehicles having air brakes. Said apparatus can be adapted for use on vehicles having hydraulic brakes by providing a return conduit from port B of three-way valve 87 to the hydraulic fluid reservoir. On vehicles equipped with hydraulic brakes, conduit 86 is connected into the braking system in such manner that it is pressurized only when the brakes are in braking position.

Three-way valve 87 is provided for manual operation by the operator. When the vehicle has been driven to its unloading position and parked with the brakes in braking position, unloading hose 60 attached to product conduit 59 and the storage container into which the contents of container 57 are to be transferred, and all other unloading preparations completed, the operator will manually switch said three-way valve 87 from its normal position permitting flow through ports A and B to a position permitting flow through ports A and C. This will cause air from the brake-air system to flow as described above through conduit 86 into cylinder 81 which will move piston 83 and switch three-way valve 62' from its normal position permitting flow through ports A and C to the position permitting flow through ports A and B. Said three-way valve 62', when open for flow through ports A and B, opens conduit 44' and will permit pressure ingress to third chamber 37 of the main valve structure, causing said valve to open as previously described. When the unloading operation has been completed, the operator manually switches three-way valve 87 to its position permitting flow through ports A and B whereupon pressure is vented from cylinder 81, piston 83 moves upward, and the spring around the stem of three-way valve 62 once again biases said three-way valve 62 to the position permitting flow through ports A and B whereupon conduit 44' is vented. Venting of said conduit 44' causes the main valve to close as previously described.

In the apparatus of FIGURES 3 and 4, it is not essential that three-way valve 62' be a spring loaded valve. In FIGURE 3 the apparatus can be arranged so that core rod 71 of solenoid 68 holds said valve 62' in the A—C position when said solenoid is not energized. Then when said solenoid 68 is energized, said valve 62' would be switched from its A—C position to its A—B position. In FIGURE 4 the apparatus can be arranged so that when spring loaded piston 83 is not in its upward position the valve 62' will be in its A—C position. Then when pressure is applied to said piston 83 to move same downward, said valve 62' would be switched from its A—C position to its A—B position. However, in both FIGURES 3 and 4 it is preferred that said three-way valve be a spring loaded valve with the spring normally biasing said valve to its A—C position for additional safety purposes.

It is believed the advantages of the valve structure and other apparatus of the invention will be apparent to those skilled in the art from the above description of its operation. The invention provides a valve structure which can be operated by the pressure of the fluids being handled. As pointed out above, said valve structure opens automatically when said fluid pressure is applied to its actuating mechanism. Said valve closes automatically when said fluid pressure is removed from its actuating mechanism. It is believed clear that any damage to conduit 44' or its associated apparatus will cause the valve to automatically close. For example, if conduit 44' should be ruptured in any manner, such action will cause the venting of third chamber 37 which will automatically cause the valve to close and unloading operations will cease. Likewise, in the event of fire, fusible plug 61 will release the contents of conduit 44' faster than it can be repressured through orifice 63. Release of fusible plug 61 will of course cause the main valve 22 to close in the manner previously described.

It is preferred that valve structure 10 be positioned in the storage container at such a level that main valve seat 16 is on essentially the same horizontal plane as the bottom of said storage container so that essentially complete drainage of liquid can be effected. This is an important advantage in transport trucks where it is desired to completely empty the tank.

The valve structure 10 will operate automatically at all normal seasonal ambient temperatures when used in a system for handling liquefied petroleum gases such as propane, or liquefied ammonia, because the vapor pressure of said liquids is sufficient to actuate the valve. In some instances when butane is being handled and the temperatures are in the neighborhood of 32° F. or lower, the vapor pressure of the butane may not be sufficient to operate the valve automatically. In such instances, the valve can be operated manually by use of the lever and cam mechanism shown in FIGURE 1. Thus, the valve operation is not dependent upon its automatic features.

A very definite advantage from a safety standpoint is that the valve is essentially completely internally mounted and is thus protected from possible damage due to mechanical blows or other shock. A further advantage of this internal mounting is that space is conveniently provided for direct coupling of a pump to the valve flange, thus providing for very compact installations on transport vehicles.

Another advantage is that the valve will not contaminate any products passed therethrough since all lubrication is effected by the material being transported.

Figure 5:
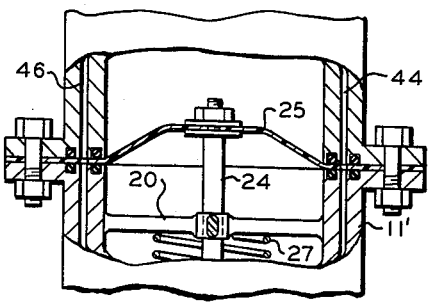
FIGURE 5 illustrates a modification of the safety flow valve of FIGURE 1.

FIGURE 5 illustrates a modification of the safety flow valve of FIGURE 1 wherein the pressure receiving member piston 23 has been replaced with another type of pressure receiving member, i.e., flexible diaphragm 25, and partition 18 has been replaced with spider support 20. The operation of the valve structure of FIGURE 5 will be clear to those skilled in the art in view of the description of the operation of the valve structure of FIGURE 1.

Although not illustrated in the drawings, it will be understood by those skilled in the art that piston 39 in FIGURE 1 can also be replaced by a flexible diaphragm. In such instance, spring 43 would bear against a plate attached to the underside of the diaphragm.

It will also be understood by those skilled in the art that the various spring biasing means 27, 43, and the spring in check valve 47 will be of a size and strength in keeping with the function they are to perform. For example, said spring in check valve 47 of FIGURE 1 will be sized to allow venting of fluid from the portion of third chamber 37 below second piston 39 at some pressure above atmospheric; but usually less than two atmospheres. Thus, with approximately atmospheric pressure in said space below piston 39, when said piston moves to its extreme downward position fluid in said space will be compressed and any pressure above that required to open said check valve 47 will be vented. When said piston 39 rises to the position illustrated in FIGURE 1, the pressure in said space below piston 39 will be about atmospheric or slightly less than atmospheric.

While the valve of the invention has been described primarily as a dispensing valve, its use is not so limited. The valve can be used as a loading valve and can be operated automatically in the same manner as previously described. Thus, the valve of the invention could well be the only valve in the storage tank or container of the transport vehicle and could be located in the bottom thereof for complete drainage of said vehicle.

Likewise, while the valve has been described primarily as employed in connection with transport vehicles, particularly self-propelled transport vehicles, its use is not so limited, said valve can be employed in railroad tank cars or in stationary storage tanks.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A unitary valve structure for controlling ingress and egress of a fluid product to and from a container, said valve structure comprising: a tubular valve casing provided with a product ingress and egress opening at one end thereof; a pilot valve body attached to and closing the other end of said casing; a valve seat within said casing adjacent said one end thereof; a chamber within said casing defined by said valve seat and said pilot valve body; a valve head disposed within said chamber; means including a pressure receiving member disposed within said chamber, connected to, and operable to move said valve head into and out of engagement with said valve seat; mechanical means within said chamber for biasing said valve head to normally closed position at said valve seat; an opening in the wall of said chamber on one side of said pressure receiving member and adjacent said valve seat; conduit means communicating with said chamber on the other side of said pressure receiving member for admitting fluid pressure of said product to and venting fluid pressure of said product from said chamber; and pilot valve means, operated by fluid pressure of said product, within said pilot valve body, and operatively connected into said conduit means for controlling flow of fluid pressure of said product to and from said chamber through said conduit means.

2. A unitary valve structure for controlling ingress and egress of a fluid product to and from a container, said valve structure comprising: a tubular valve casing provided with a product ingress and egress opening; a pilot valve body secured to and closing the other end of said casing; a main valve seat within said casing adjacent said one end thereof; a first chamber within said casing defined by said pilot valve body and said main valve seat; a main valve head disposed within said first chamber; means including a first pressure receiving member disposed within said first chamber; connected to, and operable to move said main valve head into and out of engagement with said main valve seat; an opening provided in the wall of said first chamber adjacent said main valve seat; a second chamber formed within said pilot valve body; a first pilot valve seat and a second pilot valve seat disposed on opposite sides of said second chamber; a pilot valve head disposed within said second chamber and adapted to engage either of said first and second pilot valve seats; a third chamber formed within said pilot valve body; means including a second pressure receiving member disposed within said third chamber and operatively connected through a sealed passageway to said pilot valve head in said second chamber for moving said pilot valve head back and forth between, and into and out of engagement with, said first and said second pilot valve seats; a first conduit communicating with said third chamber on one side of said second pressure receiving member for ingress and egress of fluid pressure of said product to and from said third chamber; a second conduit communicating with said third chamber on the other side of said second pressure receiving member for venting fluid pressure from said third chamber; a one-way check valve disposed in said second conduit for permitting fluid flow in a direction from said third chamber only; a third conduit communicating with said second conduit at a point downstream from said check valve and communicating with said second chamber through said second pilot valve seat for venting fluid pressure of said product from said second chamber; a fourth conduit extending between said first and said second chamber for passage of fluid pressure of said product between said first and said second chambers; and a fifth conduit extending from said first pilot valve seat to without said pilot valve body for admitting fluid pressure of said product to said second chamber.

3. A unitary valve structure for controlling ingress and egress of a fluid product to and from a container, said valve structure comprising: a tubular valve casing provided with a product ingress and egress opening at one end thereof; a pilot valve body secured to and closing the other end of said casing; a main valve seat within said casing adjacent said one end thereof; a first chamber within said casing defined by said pilot valve body and said main valve seat; a main valve head disposed in said first chamber and adapted to engage said main valve seat; a first piston slidably disposed in said first chamber and operatively connected to said main valve head for moving same toward and away from said main valve seat; a spring mounted in said first chamber and operable to normally bias said main valve head into engagement with said main valve seat; an opening provided in the wall of said first chamber beyond the path of travel of said piston and adjacent said main valve seat; a second chamber formed within said pilot valve body; a first pilot valve seat and a second pilot valve disposed on opposite sides of said second chamber; a pilot valve head disposed within said second chamber and adapted to engage either of said first and second valve seats; a third chamber formed within said pilot valve body; a second piston slidably disposed in said third chamber and operatively connected through a sealed passageway to said pilot valve head in said second chamber for moving said pilot valve head back and forth between, and into and out of engagement with, said first and second pilot valve seats; a spring disposed in said third chamber and operable to normally bias said second piston in a direction to cause said pilot valve head to engage said second pilot valve seat; a first conduit communicating with said third chamber on one side of said second piston for ingress and egress of fluid pressure of said product to and from said third chamber; a second conduit communicating with and providing a fluid pressure egress from said third chamber on the other side of said second piston; a one-way check valve disposed in said second conduit for permitting fluid flow in a direction from said third chamber only; a third conduit communicating with said second conduit at a point downstream from said check valve and communicating with said second chamber through said second pilot valve seat for venting fluid pressure of said product from said second chamber; a fourth conduit extending between said first chamber and said second chamber for passage of fluid pressure of said product between said first and said second chambers; and a fifth conduit extending from said first pilot valve seat to without said pilot valve body for admitting fluid pressure of said product to said second chamber.

4. A valve structure according to claim 3 wherein: a partition extends across and divides said first chamber into a first section and a second section; said first piston is slidably disposed in said second section; said main valve head is disposed in said first section; said first piston is connected to said main valve head by means of a rod extending through an opening provided in said partition; and said opening provided in the wall of said first chamber is provided in the wall of said first section.

5. A unitary valve structure for controlling ingress and egress of a fluid product to and from a container, said valve structure comprising: a tubular valve casing provided with a product ingress and egress opening at one end thereof; a main valve seat within said casing adjacent said one end thereof; a pilot valve body attached to and closing the other end of said casing; a first chamber within said casing and defined by said pilot valve body and said main valve seat; a first piston slidably disposed within said first chamber; a main valve head disposed within said first chamber and adapted to engage said main valve seat; a valve rod connecting said main valve head and said piston; means for biasing said main valve head to a normally engaged position at said main valve seat; an opening provided in the wall of said casing beyond the path of travel of said first piston and adjacent said main valve seat; a second chamber formed within said pilot valve body adjacent one end thereof; a first pilot valve seat and a second pilot valve seat disposed within said second chamber on opposite sides thereof; a pilot valve head disposed within said second chamber, said pilot valve head being provided with a first seating surface on one side thereof adapted to engage said first pilot valve seat and a second seating surface on the opposite side thereof adapted to engage said second pilot valve seat; a third chamber formed within said pilot valve body adjacent the other end thereof; a passageway extending from said third chamber and terminating in said second chamber at said second pilot valve seat; a second piston slidably disposed within said third chamber; a rod attached at one end to said piston and extending through said passageway to connect at its other end to said pilot valve head; sealing means in said passageway disposed around said rod for preventing fluid communication between said second and said third chambers; a spring mounted around said rod and within said third chamber for normally biasing said second piston in such direction as to cause said second seating surface on said pilot valve head to engage said second pilot valve seat; a first conduit extending through the wall of said casing, through said pilot valve body, and communicating with said third chamber for ingress and egress of fluid pressure of said product to and from said third chamber on the side of said second piston away from said spring; a second conduit extending through the wall of said casing, through said pilot valve body, and communicating with said third chamber for egress of fluid pressure from the portion of said third chamber not in communication with said first conduit; a one-way check valve disposed in said second conduit adjacent said third chamber for permitting fluid flow in a direction from said third chamber only; a third conduit communicating with said second conduit at a point downstream from said check valve and communicating with said passageway at a point between said sealing means and said second pilot valve seat for venting fluid pressure of said product from said second chamber; a fourth conduit providing communication between said first chamber and said second chamber for passage of fluid pressure of said product between said first and said second chambers; and a fifth conduit connected to said first pilot valve seat and extending from said second chamber to without said pilot valve body for admitting fluid pressure of said product to said second chamber.

6. A unitary valve structure for controlling ingress and egress of a fluid product to and from a container, said valve structure comprising: a tubular valve casing provided with a product ingress and egress opening at one end thereof; a pilot valve body attached to and closing the other end of said casing; a valve seat within said casing adjacent said one end thereof; a chamber within said casing defined by said valve seat and said pilot valve body; a valve head disposed within said chamber; means including a pressure receiving member disposed within said chamber, connected to, and operable to move said valve head into and out of engagement with said valve seat; mechanical means within said chamber for biasing said valve head to normally closed position at said valve seat; an opening in the wall of said chamber on one side of said pressure receiving member and adjacent said valve seat; first conduit means communicating with said chamber on the other side of said pressure receiving member for admitting fluid pressure of said product to and venting fluid pressure of said product from said chamber; pilot valve means within said pilot valve body and operatively connected into said first conduit means for controlling flow of fluid pressure of said product to and from said chamber through said first conduit means; and second conduit means, entirely separate from said first conduit means, for ingress and egress of fluid pressure of said product to and from said pilot valve for actuation of same.

References Cited in the file of this patent
UNITED STATES PATENTS

| | | |
|---|---|---|
| 917,740 | Anderson | Apr. 6, 1909 |
| 1,891,547 | Krichbaum | Dec. 20, 1932 |
| 1,980,063 | Jensen | Nov. 6, 1934 |
| 2,291,783 | Baak | Aug. 4, 1942 |
| 2,373,654 | Beekly | Apr. 17, 1945 |
| 2,442,953 | Krone | June 8, 1948 |
| 2,599,534 | Annin | June 10, 1952 |
| 2,663,459 | Lagrange | Dec. 22, 1953 |
| 2,955,609 | Gaubatz | Oct. 11, 1960 |
| 2,960,106 | Dyer | Nov. 15, 1960 |

UNITED STATES PATENT OFFICE
CERTIFICATE OF CORRECTION

Patent No. 3,164,358 January 5, 1965

Charles MacSporran

It is hereby certified that error appears in the above numbered patent requiring correction and that the said Letters Patent should read as corrected below.

Column 8, line 55, for "thereo" read -- thereof --; column 9, line 65, after "valve", second occurrence, insert -- seat --.

Signed and sealed this 27th day of July 1965.

(SEAL)
Attest:

ERNEST W. SWIDER
Attesting Officer

EDWARD J. BRENNER
Commissioner of Patents